(12) United States Patent
Heibel

(10) Patent No.: US 6,226,993 B1
(45) Date of Patent: May 8, 2001

(54) FULLY HYDRAULIC BRAKE BOOSTER/ MASTER CYLINDER UNIT

(75) Inventor: Helmut Heibel, Moschheim (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/489,404

(22) Filed: Jan. 21, 2000

Related U.S. Application Data

(63) Continuation of application No. PCT/EP98/04362, filed on Jul. 14, 1998.

(30) Foreign Application Priority Data

Jul. 24, 1997 (DE) .............................................. 197 31 962

(51) Int. Cl.[7] .................................................. B60T 13/00
(52) U.S. Cl. ............................................ 60/547.3; 60/560
(58) Field of Search ............................. 60/547.1, 547.3, 60/551, 552, 560

(56) References Cited

U.S. PATENT DOCUMENTS

| | | | | |
|---|---|---|---|---|
| 4,096,696 | * | 6/1978 | Van House ............................ | 60/547 |
| 4,244,185 | * | 1/1981 | Belart .................................... | 60/550 |
| 4,244,186 | | 1/1981 | Mehren . | |
| 4,543,791 | * | 10/1985 | Burgdorf et al. ...................... | 60/550 |
| 4,736,588 | * | 4/1988 | Leiber ................................... | 60/550 |
| 4,843,819 | * | 7/1989 | Leiber ................................... | 60/550 |
| 4,891,945 | * | 1/1990 | Becker .................................. | 60/547.1 |
| 5,066,077 | | 11/1991 | Farr . | |
| 5,081,841 | | 1/1992 | Nishii .................................... | 60/560 |
| 5,120,115 | | 6/1992 | Schmitt et al. . | |

FOREIGN PATENT DOCUMENTS

| | | |
|---|---|---|
| 2017185 | 11/1971 | (DE) . |
| 2725941 A1 | 12/1978 | (DE) . |
| 3832722 A1 | 3/1990 | (DE) . |
| 4029114 A1 | 4/1991 | (DE) . |
| 420175 | 9/1990 | (EP) . |
| 09099833 | 4/1995 | (JP) . |
| 97/18116 | 5/1997 | (WO) . |

* cited by examiner

*Primary Examiner*—John E. Ryznic
(74) *Attorney, Agent, or Firm*—MacMillan, Sobanski & Todd, LLC

(57) ABSTRACT

A fully hydraulic brake booster/master cylinder unit (10) for a vehicle brake system has a housing (12) and a bore (14) which is formed therein and in which is arranged sealingly and displaceably a primary piston (16) which is coupled to an input member (40) for transmitting an actuating force to the primary piston (16). Located in the bore (14) are a first pressure chamber (22), one boundary wall of which is formed by one end wall (20) of the primary piston (16), and a first booster chamber (46), one boundary wall of which is formed by the other end wall (50), located opposite the end wall (20), of the primary piston (16). The first booster chamber (46) has an inlet for hydraulic fluid under pressure which is used for boosting the actuating force. In order to bring about additional brake boosting comfortably and as required, there is arranged in the bore (14) a second booster chamber (48), to which hydraulic fluid under pressure can be supplied independently of the first booster chamber (46). In a preferred embodiment, an auxiliary piston (54) which is arranged sealingly and floatingly in the bore (14) forms with one end wall (52) a further boundary wall of the first booster chamber (46) and with its opposite other end wall (56) a boundary wall of the second booster chamber (48).

13 Claims, 1 Drawing Sheet

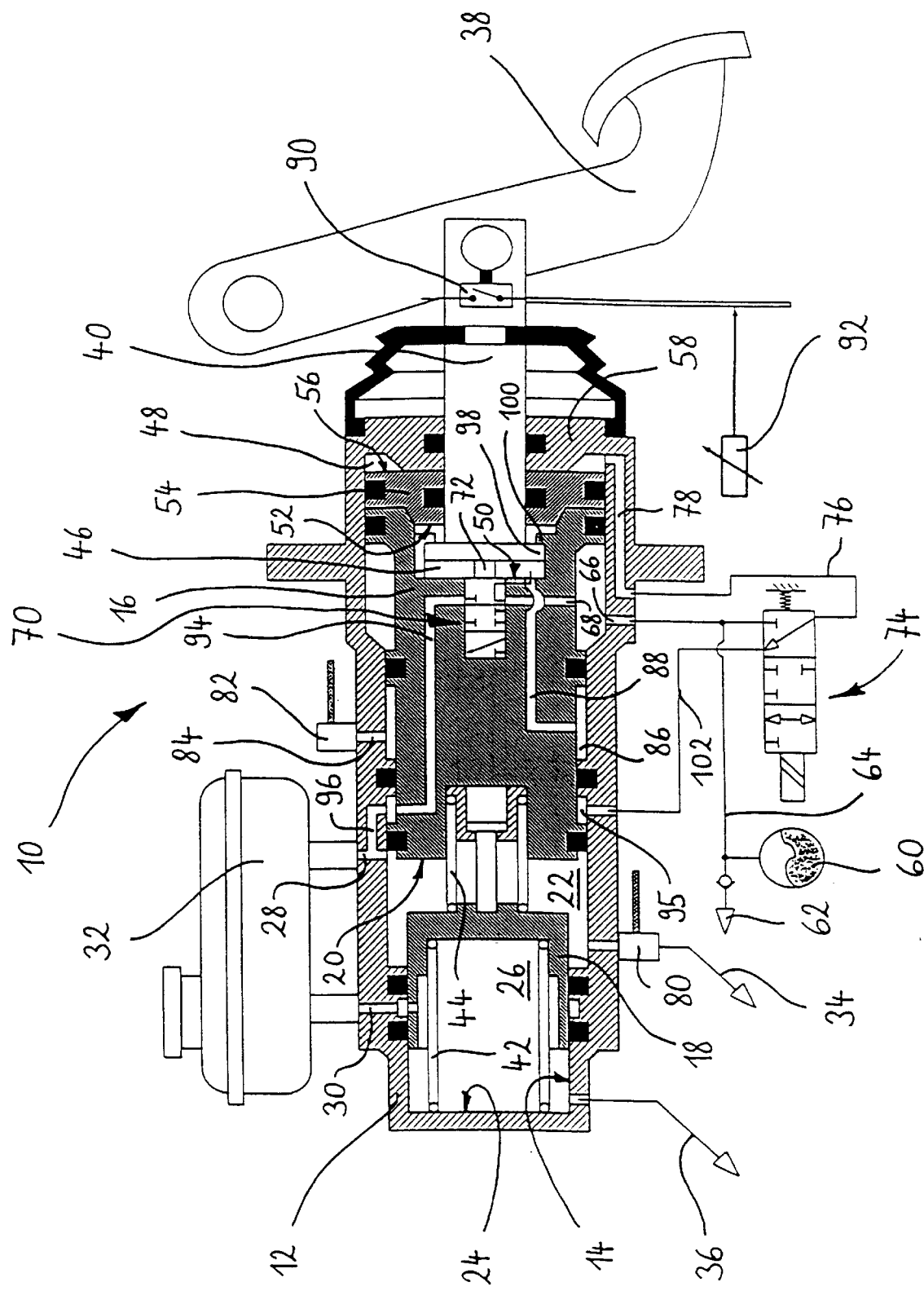

FULLY HYDRAULIC BRAKE BOOSTER/ MASTER CYLINDER UNIT

CROSS REFERENCE TO RELATED APPLICATIONS

This application is a continuation of International Application No. PCT/EP98/04362 filed Jul. 14, 1998, which claims priority to German Patent Application No. 19731962.9 filed Jul. 24, 1997.

BACKGROUND OF THE INVENTION

The invention relates to a fully hydraulic brake booster/master cylinder unit according to the precharacterizing clause of claim 1. Such a brake booster/master cylinder unit is known, for example, from WO 97/18116.

DE 40 29 114 A1 discloses a hydraulic brake booster/master cylinder unit with a first booster chamber and a second booster chamber. During operation, hydraulic pressure is fed from the first booster chamber via a pressure-reducing valve, a pressure-regulating valve or a directional or shut-off valve to the second booster chamber, in order to implement specific characteristic curves.

In contrast to the brake booster/master cylinder units still predominantly used today, in fully hydraulic brake booster/master cylinder units the boosting of the actuating force introduced is not achieved with the aid of a vacuum, but purely hydraulically. In a similar way to conventional vacuum brake boosters, the actuating force normally introduced by the vehicle driver via a brake pedal is boosted proportionally, in that hydraulic fluid under pressure is supplied to a booster chamber in a controlled manner by means of a valve, in order to assist the pressure build-up in the pressure chamber or pressure chambers of the master cylinder which are connected to the individual brake circuits of the vehicle brake system. When the brake is released, this booster chamber is then relieved of pressure again in a controlled manner by means of said valve.

It is desirable to design fully hydraulic brake booster/master cylinder units in such a way that the boosting force exerted in each case by the brake booster is variable, so that, for example, adaptation to different load states of the vehicle can take place. In specific driving situations, it may also be desirable to exert an additional braking force, for example when it has been recognized that the actuating force exerted by the driver is not sufficient in order, for example, to avoid a collision with an obstacle. The vehicle driver should, however, notice such actions on the system as little as possible, so as not to be needlessly irritated.

SUMMARY OF THE INVENTION

The object on which the invention is based, is to provide a brake booster/master cylinder unit, in which brake boosting can be adapted to the operating conditions and braking situations prevailing in each case, without this being brought to the vehicle driver's notice in a disturbing way.

Proceeding from the brake booster/master cylinder unit mentioned in the introduction, this object is achieved in that there is, in addition to the first booster chamber, a second booster chamber, to which hydraulic fluid under pressure can be supplied independently of the first booster chamber. In a way which is particularly advantageous in terms of design, the second booster chamber is produced by means of an auxiliary piston which is arranged sealingly and floatingly in the bore of the brake booster/master cylinder unit and of which one end wall forms a further boundary wall of the first booster chamber and the opposite other end wall forms a boundary wall of the second booster chamber.

Whilst the first booster chamber is supplied with hydraulic fluid under pressure in the usual way, in order, as is customary, to boost the actuating force introduced by the vehicle driver, the braking force may be boosted, as required, by the supply of hydraulic fluid under pressure into the second booster chamber, for example as a function of predetermined parameters, such as, for example, the load state, the stopping distance still available, etc., without the driver noticing this, since braking force feedback takes place only via the first booster chamber. Thus, for example, a vehicle brake system can be produced, in which a specific actuating force introduced by the driver always brings about the same vehicle deceleration, irrespective of the vehicle load. For this purpose, additional braking force assistance is provided, according to the load of the vehicle, by the introduction of hydraulic fluid under pressure into the second booster chamber, so that the driver, as a result of his actuating force, obtains vehicle deceleration which always corresponds to that which he would obtain by means of this actuating force if the vehicle were not loaded. By means of the second booster chamber, fully automatic braking operations can also be carried out, such as are necessary, for example, in connection with recently propounded headway control systems. A vehicle driver may nevertheless act in the usual way, by depressing the brake pedal, on such a braking operation taking place automatically, for example in order to boost it.

In a preferred embodiment of the brake booster/master cylinder unit according to the invention, a valve independent of a displacement of the input member of the brake booster/master cylinder unit controls the supply of pressurized hydraulic fluid to the second booster chamber. Advantageously, this valve is an electromagnetic valve designed, in particular, as a proportional valve.

According to a development of the invention, a release switch cooperating with said input member detects the end of actuation of the brake booster/master cylinder unit and the valve controlling the supply of pressurized hydraulic fluid to the second booster chamber thereupon assumes a position in which the pressure present in the second booster chamber is reduced.

In preferred embodiments of the brake booster/master cylinder unit according to the invention, a first pressure sensor detects the pressure in the first pressure chamber (primary pressure chamber) of the master cylinder and a second pressure sensor detects the pressure in the first booster chamber. By evaluation of the signals from these pressure sensors, it is possible, for example, to determine whether the braking force assistance provided by means of the first booster chamber is sufficient to achieve a desired deceleration.

All the embodiments of the brake booster/master cylinder unit according to the invention advantageously cooperate with an electronic control apparatus activating the valve which controls the supply of pressurized hydraulic fluid to the second booster chamber. Preferably, the control apparatus will control said valve, inter alia, as a function of signals from the release switch and/or from the pressure sensors. The control apparatus may, of course, also carry out the activation, for example in cooperation with a pedal travel sensor, of that valve which controls the supply of hydraulic pressure to the first booster chamber.

BRIEF DESCRIPTION OF THE DRAWINGS

The FIGURE is a schematic partial cross-sectional view of an exemplary embodiment of a brake booster/master cylinder unit, in accordance with the present invention.

DETAILED DESCRIPTION OF THE PREFERRED EMBODIMENT

The FIGURE shows a fully hydraulic brake booster/master cylinder unit, designated as a whole by 10, for a hydraulic vehicle brake system. The unit 10 has an elongate housing 12 with a stepped bore 14 formed therein. A primary piston 16 and a secondary piston 18 are arranged sealingly and displaceably in the bore 14. One end wall 20 of the primary piston 16, together with the end wall, facing it, of the secondary piston 18 and the bore 14, delimits a first pressure chamber 22, whilst the secondary piston 18, of hollow design here, together with the bore 14 and the end wall 24 of the latter, delimits a second pressure chamber 26. The two pressure chambers 22 and 26 are connected to a reservoir 32 for hydraulic fluid via lines 28 and 30 respectively. The first pressure chamber 22 is intended for connection to a first brake circuit of the hydraulic vehicle brake system by means of a line 34 indicated merely diagrammatically, whilst the second pressure chamber 26 is intended for connection to a second brake circuit of the vehicle brake system via an identical line 36.

A vehicle driver, in order to initiate a braking operation, can exert an actuating force on the primary piston 16 via a brake pedal 38 and a rod-shaped input member 40 articulated on the latter. This actuating force leads to a displacement of the primary piston 16 to the left and therefore, after the inflow and return line 28 has been closed by the primary piston 16, to a rise in pressure of the hydraulic fluid contained in the first pressure chamber 22. This pressure rise ensures that the secondary piston 18 is likewise displaced to the left, so that the hydraulic pressure also rises correspondingly in the second pressure chamber 26, after the inflow and return line 30 has been closed as a result of the displacement of the secondary piston 18. The increased hydraulic pressure from the first pressure chamber 22 and the second pressure chamber 26 is fed into the two brake circuits via the lines 34 and 36.

After a braking operation has terminated, that is to say after the vehicle driver has taken his foot off the brake pedal 38, restoring springs 42 and 44 ensure that both the secondary piston 18 and the primary piston 16 are moved back again into their initial positions, illustrated in the FIGURE, in which the fluid connection between the two pressure chambers 22, 26 and the reservoir 32 is opened.

So that the actuating force introduced by the vehicle driver via the input member 40 can be boosted, a first booster chamber 46 and a second booster chamber 48 are arranged in the bore 14 of the brake booster/master cylinder unit 10. The first booster chamber 46 is delimited by the other end wall 50, located opposite the end wall 20, of the primary piston 16 and by an opposite end wall 52 of an auxiliary piston 54, explained in more detail later, and, in the case of displacement of the primary piston 16 relative to the auxiliary piston 54, by the bore 14. The second booster chamber 46 is delimited by the other end wall 56, located opposite the end wall 52, of the auxiliary piston 54, by the bore 14 and by a bore closure 58 not illustrated as a separate part in the FIGURE. The input member 40 passes sealingly and displaceably both through the bore closure 58 and through the auxiliary piston 54 which is itself received sealingly and floatingly in the bore 14.

Hydraulic fluid under pressure can be supplied to the first booster chamber 46 from a pressure accumulator 60, which is in fluid connection at 62 with a pump, not illustrated here, which holds the pressure in the pressure accumulator 60 at a predetermined value, via a connecting line 64, an inlet 66 and a line 68 present in the primary piston 16. In the exemplary embodiment shown, the pressure supply is controlled by a mechanical valve 70 having three switching positions, which is received centrally in the primary piston 16 and which is coupled mechanically to the input member 40, for joint movement, via a pin 72. The three switching positions of the valve 70 are a pressure build-up position, a pressure holding position and a pressure reduction position.

Hydraulic fluid under pressure can also be supplied to the second booster chamber 48 from the pressure accumulator 60. The pressure supply to the second booster chamber 48 is controlled by an electromagnetic valve 74 which likewise has three switching positions (pressure build-up position, pressure holding position and pressure reduction position) and which is in fluid connection with the pressure accumulator 60 via the connecting line 64 and in fluid connection with an inlet 78 of the second booster chamber 48 via a supply line 76.

A first pressure sensor 80 is arranged in the line 28 and measures the hydraulic pressure prevailing in the first pressure chamber 22. A second pressure sensor 82 is in fluid connection with the first booster chamber 46 via a transverse bore 84 passing through the wall of the housing 12, via an annular space 86 between the primary piston 16 and the bore 14 and via a line 88 running through the primary piston 16, so that the hydraulic pressure prevailing in said booster chamber 46 can be measured.

A release switch 90 cooperating with the brake pedal 38 and a pedal travel sensor 92 are located in the region of the free end of the input member 40, said free end projecting out of the brake booster/master cylinder unit 10. The release switch 90 detects when the brake pedal 38 is freed, that is to say released, whilst the pedal travel switch 92 measures the actuating travel of the input member 40.

The electromagnetic valve 74, the two pressure sensors 80 and 82, the release switch 90 and the pedal travel sensor 92 are electrically connected to an electronic control apparatus, not illustrated here, which processes the signals from the pressure sensors 80, 82, the release switch 90 and the pedal travel sensor 92 and controls the electromagnetic valve 74 as a function of these signals.

The functioning of the brake booster/master cylinder unit 10 illustrated is now explained, a so-called "normal" braking operation being described first, that is to say a braking operation in which the second booster chamber 48 remains inactive. If the vehicle driver actuates the brake pedal 38 during such a "normal" braking operation, this movement is transmitted via the input member 40 to the mechanical control valve 70 which is connected to the latter and which is thereby displaced relative to the primary piston 16 into its pressure build-up position, reproduced in the FIGURE, in which an inflow of pressurized hydraulic fluid out of the pressure accumulator 60 via the connecting line 64, the inlet 66, the line 68 and the valve 70 into the first booster chamber 46 can take place. If a boosting pressure proportional to the respective pedal actuating force is reached in the first booster chamber 46, the force reaction leads, via the hydraulically effective surface of the input member 40 in the first booster chamber 46, to a relative displacement between the control valve 70 and the primary piston 16, such that the valve 70 assumes its pressure holding position, in which the first booster chamber 46 is shut off relative to an inflow or outflow of hydraulic fluid. The actuating force introduced via the brake pedal 38, together with the force generated in the first booster chamber 46 by the increased hydraulic pressure, then acts on the primary piston 16, thus leading to a corresponding pressure in the two pressure chambers 22 and 26 and consequently to a corresponding braking force on those wheel brakes which are in fluid connection with the two pressure chambers 22 and 26. If the braking force is to be increased, the vehicle driver will actuate the brake pedal 38 more firmly, whereupon the control valve 70 is again displaced relative to the primary piston 16 and resumes its pressure build-up position, so that further hydraulic fluid under pressure can flow into the first booster chamber 46. After the position of equilibrium corresponding to this actuating force has been reached, the valve 70 assumes its pressure holding position, as before. The described direct proportionality of the boost of the pedal actuating force allows good meterability of the brake system, which is necessary, for example, in order to come to a stop at a specific desired point. During the entire cycle described above, the auxiliary piston 54 remains in the position illustrated, that is to say the input member 40 and the primary piston 16 are displaced to the left relative to the auxiliary piston 54.

After the termination of the braking operation, the vehicle driver releases the brake pedal 38, with the result that the control valve 70 is displaced relative to the primary piston 16 into its pressure reduction position, in which said control valve shuts off the line 68 and, instead, makes a fluid connection between the first booster chamber 46 and the reservoir 32 via a line 94 running through the primary piston 16, via a radial annular space 95 between the primary piston 16 and the bore 14 and via a return connection 96. The first booster chamber 46 is thereby relieved of pressure.

It may be pointed out, at this juncture, that, contrary to the illustration in the FIGURE, a radial projection 98 at that end of the input member 40 which is located in the first booster chamber 46 comes to bear on a stop 100 of the primary piston 16 only when the control valve 70 assumes its pressure reduction position.

The case of additional brake boosting by means of the second booster chamber 48 is now described. The commencement of such a braking operation with increased brake boosting takes place initially as described above, that is to say the control valve 70 is displaced into its pressure build-up position and hydraulic fluid under pressure flows into the first booster chamber 46, until the control valve 70 assumes its pressure holding position after the associated position of equilibrium is reached. If the electronic control apparatus, not illustrated, recognizes on the basis of an evaluation of the signals supplied to it, for example, that the pressure generated in the first pressure chamber 22 by the pedal actuating force and the hydraulic pressure in the first booster chamber 46 is not sufficient to achieve a specific vehicle deceleration which is normally achieved by means of this brake pressure, said control apparatus transfers the electromagnetic valve 74 into its pressure build-up position, so that hydraulic fluid under pressure can flow out of the pressure accumulator 60 via the electromagnetic valve 74, the supply line 76 and the inlet 78 into the second booster chamber 48. The pressure rise in the second booster chamber 48 leads to a displacement of the auxiliary piston 54 to the left and consequently to a superposed boost which is transmitted to the primary piston 16 and consequently leads to a corresponding pressure rise in the first pressure chamber 22 and the second pressure chamber 26. The displacement of the auxiliary piston 54 to the left does not result in any appreciable pressure rise in the first booster chamber 46, since, on account of the dynamic processes taking place inside the brake booster/master cylinder unit 10 during the displacement of the auxiliary piston 54, the control valve 70 moves briefly into its pressure reduction position, until the auxiliary piston 54 comes to bear on the primary piston 16. The pressure accumulator 60 is dimensioned in such a way that the corresponding quantity of hydraulic fluid which has to be introduced into the second booster chamber 48 for the described displacement of the auxiliary piston 54 can be supplied quickly and without any appreciable pressure loss.

If the first pressure sensor 80 detects that the desired brake pressure necessary for achieving specific vehicle deceleration is reached in the first pressure chamber 22, the electronic control apparatus connected to said sensor switches the electromagnetic valve 74 into the pressure holding position, in which the second booster chamber 48 is shut off relative to an inflow or outflow of hydraulic fluid. The vehicle driver does not notice anything of the additional brake boost achieved in this way, since the force reaction on the brake pedal 38 takes place only via the hydraulically-effective surface of the input member 40 in the first booster chamber 46.

Finally, when the vehicle driver frees the brake pedal 38 after the termination the braking operation, this freeing is recorded by the release switch 90, whereupon the electronic control apparatus connected to it switches the electromagnetic valve 74 into the pressure reduction position, in which a fluid connection to the reservoir 32 is made via the inlet 78, the supply line 76, the electromagnetic valve 74, a return line 102, the annular space 95 and the return connection 96, in order to relieve the second booster chamber 48 of the hydraulic pressure. This pressure reduction position is the basic position of the electromagnetic valve 74, into which the latter is resiliently prestressed and which it also assumes whenever additional brake boost by means of the second booster chamber 48 is not required.

It is apparent from the foregoing that the control valve 70 responsible for controlling the pressure of the first booster chamber 46 operates mechanically and as a function of the actuating travel, whilst the electromagnetic valve 74 responsible for controlling the pressure of the second booster chamber 48 operates independently of the actuating travel and independently of the control valve 70.

In addition to the above-described use of the second booster chamber 48 in conjunction with the first booster chamber 46, the electronic control apparatus may also, as a result of the activation of the electromagnetic valve 74 and the corresponding supply of hydraulic fluid under pressure into the second booster chamber 48, carry out braking operations taking place completely automatically, that is to say without actuation by the vehicle driver, for example in cooperation with a headway control system. Since the first booster chamber 46 remains pressureless during such braking operations taking place automatically, the vehicle driver can act directly on the automatic braking operation and, by actuating the brake pedal 38 and displacing the control valve 70 correspondingly into the pressure build-up position, initiate a boosted braking operation.

The exemplary embodiment illustrated, having the floatingly arranged auxiliary piston 54, affords the advantage that existing brake booster/master cylinder units having only one booster chamber can be provided with a second booster chamber without any far-reaching change to the present design. The other advantage of having a second booster chamber, in addition to the advantages already described, is that, if the control valve 70 coupled to the input member 40 fails, the boost function for "normal" braking can be carried out by means of corresponding activation of the electromagnetic valve 74 with the aid of the second booster chamber 48.

The second booster chamber 48 therefore constitutes a safeguard against failure (so-called fail-safe function).

Although not described specially here, the control valve 70 does not need to be actuated mechanically via the input member 40, but could alternatively also be readily activated by the electronic control apparatus by using of information provided by the pedal travel sensor 92.

What is claimed is:

1. A fully hydraulic brake booster/master cylinder unit for a vehicle brake system, with
   a housing and a bore which is formed therein and in which is arranged sealingly and displaceably a primary piston which is coupled to an input member for transmitting an actuating force to the primary piston,
   a first pressure chamber which is arranged in the bore and one boundary wall of which is formed by one end wall of the primary piston, and
   a first booster chamber which is arranged in the bore and one boundary wall of which is formed by the other end wall, located opposite the end wall, of the primary piston, with an inlet for hydraulic fluid under pressure in order to boost the actuating force,
   a second booster chamber arranged in the bore, wherein the brake booster/master cylinder unit is adapted to supply hydraulic fluid under pressure to either one of the first and second booster chambers independently of each other.

2. The brake booster/master cylinder unit according to claim 1, characterized in that an auxiliary piston which is arranged sealingly and floatingly in the bore forms with one end wall a further boundary wall of the first booster chamber, the opposite other end wall of said auxiliary piston forming a boundary wall of the second booster chamber.

3. The brake booster/master cylinder unit according to claim 1, characterized in that a valve independent of a displacement of the input member controls the supply of pressurized hydraulic fluid to the second booster chamber.

4. The brake booster/master cylinder unit according to claim 3, characterized in that the valve is an electromagnetic valve preferably designed as a proportional valve.

5. The brake booster/master cylinder unit according to claim 3, characterized in that a release switch cooperating with the input member detects the end of actuation of the brake booster/master cylinder unit and the valve thereupon assumes a pressure reduction position, in which the pressure present in the second booster chamber is reduced.

6. The brake booster/master cylinder unit according to one of claim 3, characterized in that a first pressure sensor detects the pressure in the first pressure chamber and a second pressure sensor detects the pressure in the first booster chamber.

7. The brake booster/master cylinder unit according to one of claim 5, characterized in that an electronic control apparatus controls the valve as a function of a signal from the release switch.

8. The brake booster/master cylinder unit according to one of claim 6, characterized in that an electronic control apparatus controls the valve as a function of a signal from the pressure sensors.

9. The brake booster/master cylinder unit of claim 1, wherein an increase in pressure of the second booster chamber biases the primary piston in a direction to cause an increase pressure in the first pressure chamber.

10. The brake booster/master cylinder unit according to claim 1, characterized in that a second valve controls the supply of pressurized hydraulic fluid to the first booster chamber.

11. The brake booster/master cylinder unit according to claim 10, characterized in that the second valve is mechanically coupled to the input member.

12. The brake booster/master cylinder unit according to claim 3, characterized in that a second valve controls the supply of pressurized hydraulic fluid to the first booster chamber.

13. The brake booster/master cylinder unit according to claim 12, characterized in that the second valve is mechanically coupled to the input member.

* * * * *